United States Patent
Gokan et al.

(10) Patent No.: US 10,503,985 B2
(45) Date of Patent: Dec. 10, 2019

(54) PEDESTRIAN DETERMINATION METHOD AND DETERMINATION DEVICE

(71) Applicant: Nissan Motor Co., Ltd., Yokohama-shi, Kanagawa (JP)

(72) Inventors: Toshimichi Gokan, Kanagawa (JP); Takuya Inoue, Kanagawa (JP); Tatsuya Suzuki, Kanagawa (JP); Kazuo Tamaki, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 16/071,501

(22) PCT Filed: Nov. 28, 2016

(86) PCT No.: PCT/JP2016/085129
§ 371 (c)(1),
(2) Date: Jul. 20, 2018

(87) PCT Pub. No.: WO2017/126225
PCT Pub. Date: Jul. 27, 2017

(65) Prior Publication Data
US 2019/0034742 A1    Jan. 31, 2019

(30) Foreign Application Priority Data
Jan. 22, 2016    (JP) ................. 2016-011031

(51) Int. Cl.
*G06K 9/00* (2006.01)
*B60T 7/12* (2006.01)
(Continued)

(52) U.S. Cl.
CPC ............ *G06K 9/00805* (2013.01); *B60T 7/12* (2013.01); *G01S 13/931* (2013.01);
(Continued)

(58) Field of Classification Search
CPC .. G06K 9/00805; G06K 9/00369; G06T 7/73; G06T 2207/30261; G06T 2207/10044;
(Continued)

(56) References Cited

U.S. PATENT DOCUMENTS 9,798,002 B2 * 10/2017 Baba ..................... G01S 13/867
2014/0297171 A1   10/2014 Minemura et al.
2014/0333467 A1   11/2014 Inomata

FOREIGN PATENT DOCUMENTS

CN    101305295 A    11/2008
CN    101558415 A    10/2009
(Continued)

OTHER PUBLICATIONS

Xiafen, "Doubt Interpretation and Integration: A Study on the Strategies in Solving Difficult Problems in the Phased Teaching of the Same Content in Primary School Mathematics", Jul. 2010, p. 143-158, Ningbo Publishing House, China.
(Continued)

*Primary Examiner* — Russell Frejd
(74) *Attorney, Agent, or Firm* — Global IP Counselors, LLP

(57) ABSTRACT

A host vehicle is provided with external environment recognition sensors that acquire forward information to determine that a pedestrian is present in a forward position of the host vehicle using the external environment recognition sensors. In this pedestrian determination method, a front camera and a millimeter wave radar are provided as the external environment recognition sensors. When a pedestrian candidate is detected in a forward position of the host vehicle based on an image signal from the front camera, a matching area is set with the position of the detected pedestrian candidate as the center point. When the position of the object that is closest to the pedestrian candidate from among the plurality of objects detected by reflected waves
(Continued)

from the millimeter wave radar is within the matching area thereby establishing a match, the pedestrian candidate is determined to be a pedestrian.

8 Claims, 9 Drawing Sheets

(51) Int. Cl.
*G01S 13/93* (2006.01)
*G06T 7/73* (2017.01)

(52) U.S. Cl.
CPC ............ *G06K 9/00369* (2013.01); *G06T 7/73* (2017.01); *G06T 2207/10044* (2013.01); *G06T 2207/30261* (2013.01)

(58) Field of Classification Search
CPC .... G01S 13/931; G01S 13/867; G01S 13/723; G01S 13/42; G01S 7/411; G01S 13/93; G01S 13/86; G01S 2013/9375; G01S 17/936; G01S 2013/9367; B60T 7/12; G08G 1/16; G08G 1/09
See application file for complete search history.

(56) References Cited

FOREIGN PATENT DOCUMENTS

| | | |
|---|---|---|
| CN | 102741901 A | 10/2012 |
| CN | 103359112 A | 10/2013 |
| CN | 103837872 A | 6/2014 |
| CN | 104054005 A | 9/2014 |
| CN | 105247592 A | 1/2016 |
| CN | 105264587 A | 1/2016 |
| DE | 11 2014 003 177 T5 | 3/2016 |
| EP | 1564703 A1 | 8/2005 |
| EP | 1947475 A1 | 7/2008 |
| EP | 2806287 A1 | 11/2014 |
| JP | 2008-234029 A | 10/2008 |
| JP | 2009-214764 A | 9/2009 |
| JP | 2009-294842 A | 12/2009 |
| JP | 2013-145205 A | 7/2013 |
| JP | 2013-228915 A | 11/2013 |
| JP | 2014-35560 A | 2/2014 |
| JP | 2014-41427 A | 3/2014 |
| JP | 2014-137288 A | 7/2014 |
| WO | 2015/005001 A1 | 1/2015 |

OTHER PUBLICATIONS

Li, "Television Photography", Sep. 1989, p. 87-90, Guangdong Higher Education Press, Guangzhou, China.

* cited by examiner

PEDESTRIAN DETERMINATION METHOD AND DETERMINATION DEVICE

CROSS-REFERENCE TO RELATED APPLICATIONS

This application is a U.S. national stage application of International Application No. PCT/JP2016/085129, filed on Nov. 28, 2016, which claims priority to Japanese Patent Application No. 2016-011031, filed on Jan. 22, 2016. The entire contents disclosed in Japanese Patent Application No. 2016-011031 is hereby incorporated herein by reference.

BACKGROUND

Field of the Invention

The present invention relates to a pedestrian determination method and determination device, which is equipped with a camera and a radar as external environment recognition sensors, and which determines that a pedestrian is present in a forward position of a host vehicle during travel.

Background Information

An automatic braking device is known from the prior art, in which an object whose presence is confirmed by a camera from among data that are output from a radar device is determined to be an obstacle, and the output time of the automatic brake is changed according to the type of obstacle (for example, refer to Japanese Laid-Open Patent Application No. 2009-214764—Patent Document 1).

SUMMARY

However, in the conventional device described above, an object whose presence is confirmed by a camera is determined to be an obstacle after a radar device outputs data. Consequently, when the radar device outputs a plurality of objects as data, it is necessary to recognize each of the shapes of the plurality of objects to determine the types of obstacles. Therefore, if a pedestrian is included in the plurality of objects, it is necessary to recognize each of the shapes of the plurality of objects and then to recognize the pedestrian from among the objects determined to be obstacles, so that there is a problem that pedestrian determination takes time.

In light of the problems described above, an object of the present invention is to provide a pedestrian determination method and determination device, wherein the pedestrian determination responsiveness is improved, when determining a pedestrian using a camera and a radar during travel.

In order to realize the object described above, the present invention comprises external environment recognition sensors that obtain forward information of a host vehicle, and that uses the external environment recognition sensors to determine that a pedestrian is present in a forward position of the host vehicle. A camera and a radar are provided as external environment recognition sensors. When a pedestrian candidate is detected in a forward position of the host vehicle based on an image signal from the camera, a matching area is set with the position of the detected pedestrian candidate as the center point. When the position of the object closest to the pedestrian candidate from among the plurality of objects detected by the reflected waves from the radar is present within the matching area and a match is established, the pedestrian candidate is determined to be a pedestrian. The matching area is expanded when the position of the pedestrian candidate and the position of the object are in the same direction.

Therefore, a pedestrian candidate is detected first with a camera that is capable of independently detecting a pedestrian by using shape recognition, and a matching area is set in advance with the pedestrian candidate as the center point. Then, when a pedestrian is present in front of the host vehicle, an object that is detected by a radar, which has higher object recognition capability than a camera, is used for determining a match with the pedestrian, thereby determining the pedestrian within a short period of time. As a result, it is possible to improve the pedestrian determination responsiveness, when determining a pedestrian using a camera and radar during travel. In addition, the matching area is expanded when the position of the pedestrian candidate and the position of the object are in the same direction. Accordingly, even at a long distance between the host vehicle and the pedestrian candidate, a matching determination becomes possible by using the expanded matching area, under the condition that the positions of the pedestrian candidate and the object are in the same direction.

DETAILED DESCRIPTION OF THE EMBODIMENTS

Figure 1:
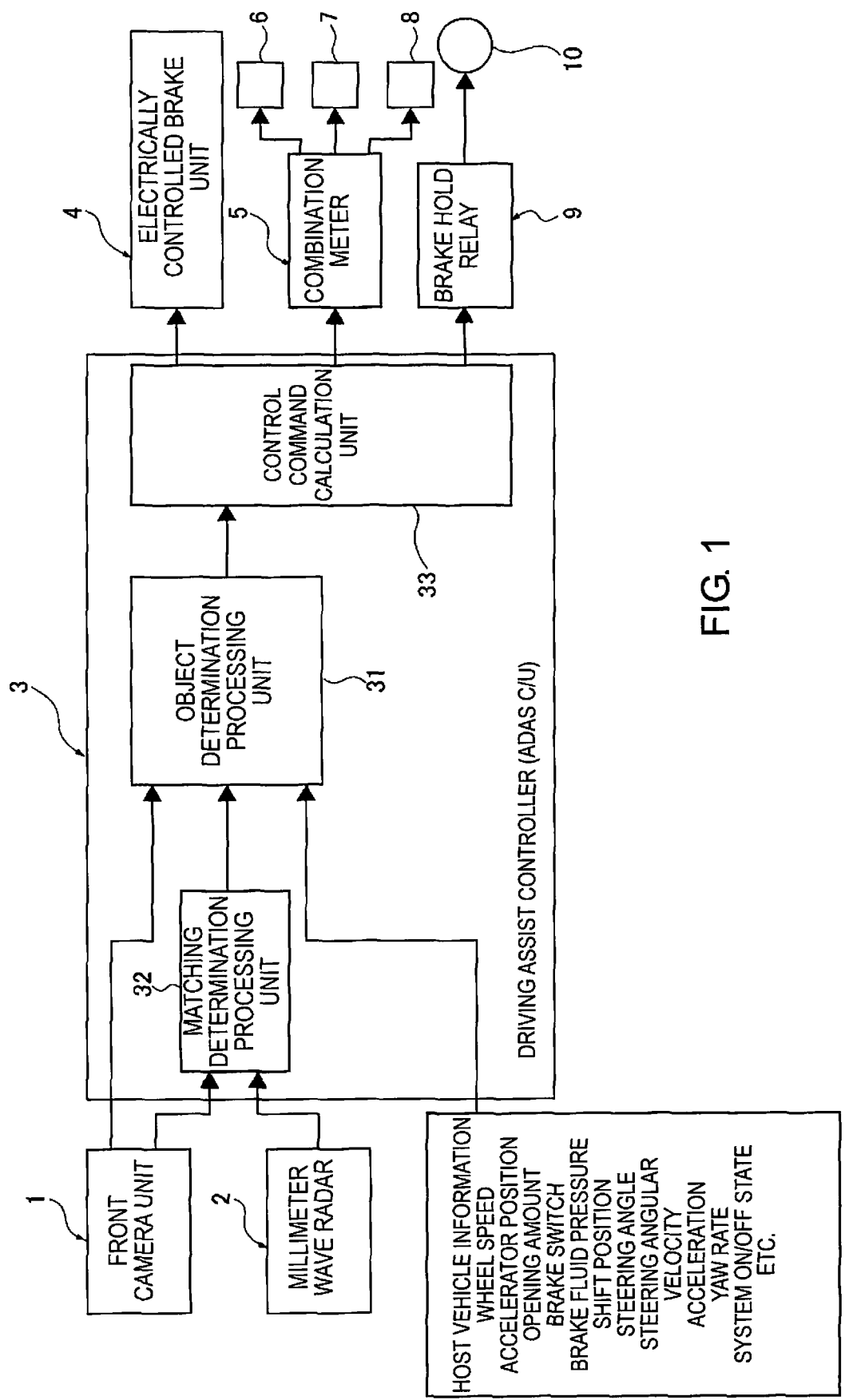
FIG. 1 is a view of a driving assist system illustrating an overall configuration of a driving assist system of an electrically driven vehicle, to which are applied the pedestrian determination method and determination device according to a first embodiment.

A preferred embodiment for realizing the pedestrian determination method and determination device of the present invention is described below based on a first embodiment illustrated in the drawings.

First Embodiment

The configuration is described first. The pedestrian determination method and determination device according to the first embodiment are applied to an electrically driven vehicle (hybrid vehicle, electric vehicle, fuel cell vehicle, etc.) equipped with an automatic brake control system (referred to as "emergency brake control system") as one example of a driving assist system. The "overall configuration of the driving assist system," the "detailed configuration of the matching determination processing unit," the "configuration of the automatic brake control process," and the "configuration of the matching determination process" will be described separately with respect to the configuration of the first embodiment.

Overall Configuration of the Driving Assist System

FIG. 1 illustrates a driving assist system of an electrically driven vehicle, to which are applied the pedestrian determination method and determination device according to the first embodiment. The overall configuration of the driving assist system will be described below with reference to FIG. 1.

The driving assist system comprises a front camera unit 1, a millimeter wave radar 2, a driving assist controller 3, and an electrically controlled brake unit 4 as the main components, as illustrated in FIG. 1. The driving assist system also comprises a combination meter 5, an alarm buzzer 6, a brake warning lamp 7, a brake warning display 8, a brake hold relay 9 and a stop lamp 10 as peripheral components.

The front camera unit 1 is capable of capturing an image of the conditions in front of the host vehicle using an imaging element, such as a CCD or CMOS imaging element, and, for example, is attached to the central upper position of the windshield glass and detects image information from the area in front of the host vehicle, which is the imaging area. The detected image information is transmitted to the driving assist controller 3 by using CAN communication. "CAN" is an acronym for "Controller Area Network."

The millimeter wave radar 2 is a radar system that is capable of detecting conditions in front of the host vehicle using radio waves in the millimeter wave band, and, for example, is attached to the front bumper and detects reflected waves from objects (preceding vehicles, pedestrians, etc.) that are present in front of the host vehicle by the forward irradiation of millimeter waves. The presence/absence information of an object and the direction/position information of the object according to the detected reflected waves are transmitted to the driving assist controller 3 by using CAN communication.

The driving assist controller 3 transfers signals that are necessary for control, and, for example, is attached to the innermost position of the glove box and carries out driving assist control such as automatic brake control. In addition to receiving information from the front camera unit 1 and the millimeter wave radar 2 based on CAN communication signals, the driving assist controller 3 receives host vehicle information such as wheel speed, accelerator position opening amount, brake switch, brake fluid pressure, shift position, steering angle, steering angular velocity, acceleration, yaw rate, and system ON/OFF state, from various controllers, which are not shown, based on CAN communication signals. The driving assist controller 3 transmits a brake fluid pressure command signal to the electrically controlled brake unit 4 via a CAN communication line, when the preliminary braking or the main braking is operated after the automatic brake control is started. Then, when the automatic brake control is started, the driving assist controller transmits a buzzer output signal and a meter display signal to the combination meter 5 via the CAN communication line. Furthermore, the driving assist controller transmits a stop lamp drive signal to the brake hold relay 9, when the preliminary braking or the main braking is operated after the automatic brake control is started.

The driving assist controller 3 here is referred to as an "ADAS control unit (ADAS C/U)" and has the function of an integrated controller that assists a plurality of driving operations, including an automatic brake control function (FEB function). "FEB" is an acronym for "Forward Emergency Braking." Examples of driving assist control functions other than the automatic brake control function (FEB function) include an automatic cruise control function (ACC function), a lane keeping control function (LKS function), and a vehicle behavior control function (VDC function). "ADAS" is an acronym for "Advanced Driver Assistance System."

The electrically controlled brake unit 4 contains an integrated control unit, master cylinder, and electric booster (corresponding to cooperative regenerative braking in an electrically driven vehicle), which controls the fluid pressure to be fed to an ABS/VDC actuator. When the control unit of this electrically controlled brake unit 4 receives a brake fluid pressure command signal from the driving assist controller 3 via a CAN communication line, the control unit drives the motor of the electric booster and moves a piston so as to generate master cylinder fluid pressure. When a braking operation by the driver is detected, a driver brake detection signal is transmitted from this electrically controlled brake unit 4 to the driving assist controller 3 via the CAN communication line.

When a buzzer output signal from the driving assist controller 3 is received via the CAN communication line, the combination meter 5 sounds an alarm buzzer 6. In addition, when a meter display signal from the driving assist controller 3 is received via the CAN communication line, the combination meter flashes or illuminates the brake warning lamp 7 as well as illuminating the brake warning display 8.

When a stop lamp drive signal from the driving assist controller 3 is received via the CAN communication line, the brake hold relay 9 illuminates the stop lamp 10, bypassing the stop lamp circuit.

The driving assist controller 3 comprises an object determination processing unit 31, a matching determination processing unit 32, and a control command calculation unit 33, as illustrated in FIG. 1.

The object determination processing unit 31 acquires host vehicle information and camera information, that determines that objects are present in front of the vehicle including preceding vehicles and pedestrians, based on image information from the front camera unit 1, and further detects pedestrian candidates from the objects. Then, when it is detected that a pedestrian candidate has been present in the predicted path of the host vehicle for a set period of time, execution of an automatic brake control is permitted, with the detected pedestrian candidate as the target of control. After the execution of the automatic brake control is permitted, the distance between the host vehicle and the pedestrian candidate is divided by the relative speed (=host vehicle speed) to calculate the predicted time-to-contact TTC. Then, it is determined whether the predicted time-to-contact TTC is less than or equal to the alarm threshold value TTC1, less than or equal to the preliminary braking threshold value TTC2, and less than or equal to the main braking threshold value TTC3. When the predicted time-to-contact TTC becomes less than or equal to the alarm threshold value TTC1, an automatic brake control is started using an alarm. When the predicted time-to-contact TTC becomes less than or equal to the preliminary braking threshold value TTC2, preliminary braking is started using an alarm and slow braking. When the predicted time-to-contact TTC become less than or equal to the main braking threshold value TTC3, main braking is started using an alarm and sudden braking. "TTC" is an acronym for "Time To Collision."

After starting the automatic brake control, the matching determination processing unit 32 carries out matching determination process to determine whether a pedestrian candidate detected by the front camera unit 1 matches an object detected by the reflected waves from the millimeter wave radar 2. The "detailed configuration of the matching determination processing unit" will be described further below.

The control command calculation unit 33 receives the processing result from the matching determination processing unit 32 to calculate a control command and outputs command signals to the electrically controlled brake unit 4, the combination meter 5, and the brake hold relay 9, via the CAN communication line. The control command calculation unit outputs a brake fluid pressure command signal to the electrically controlled brake unit 4 for carrying out preliminary braking by using slow braking when the predicted time-to-contact TTC becomes less than or equal to the preliminary braking threshold value TTC2, and outputs a brake fluid pressure command signal for carrying out main braking by using sudden braking when the predicted time-to-contact TTC becomes less than or equal to the main braking threshold value TTC3. The control command calculation unit outputs, to the combination meter 5, a buzzer output signal for sounding an alarm buzzer 6, a warning indication signal for flashing or lighting the brake warning lamp 7, and a meter display signal for lighting the brake warning display 8, when the predicted time-to-contact TTC becomes less than or equal to the alarm threshold value TTC1. The control command calculation unit outputs a stop lamp drive signal to the brake hold relay 9 for bypassing the stop lamp circuit and illuminating the stop lamp 10 when the predicted time-to-contact TTC becomes less than or equal to the preliminary braking threshold value TTC2.

Detailed Configuration of the Matching Determination Processing Unit

Figure 2:
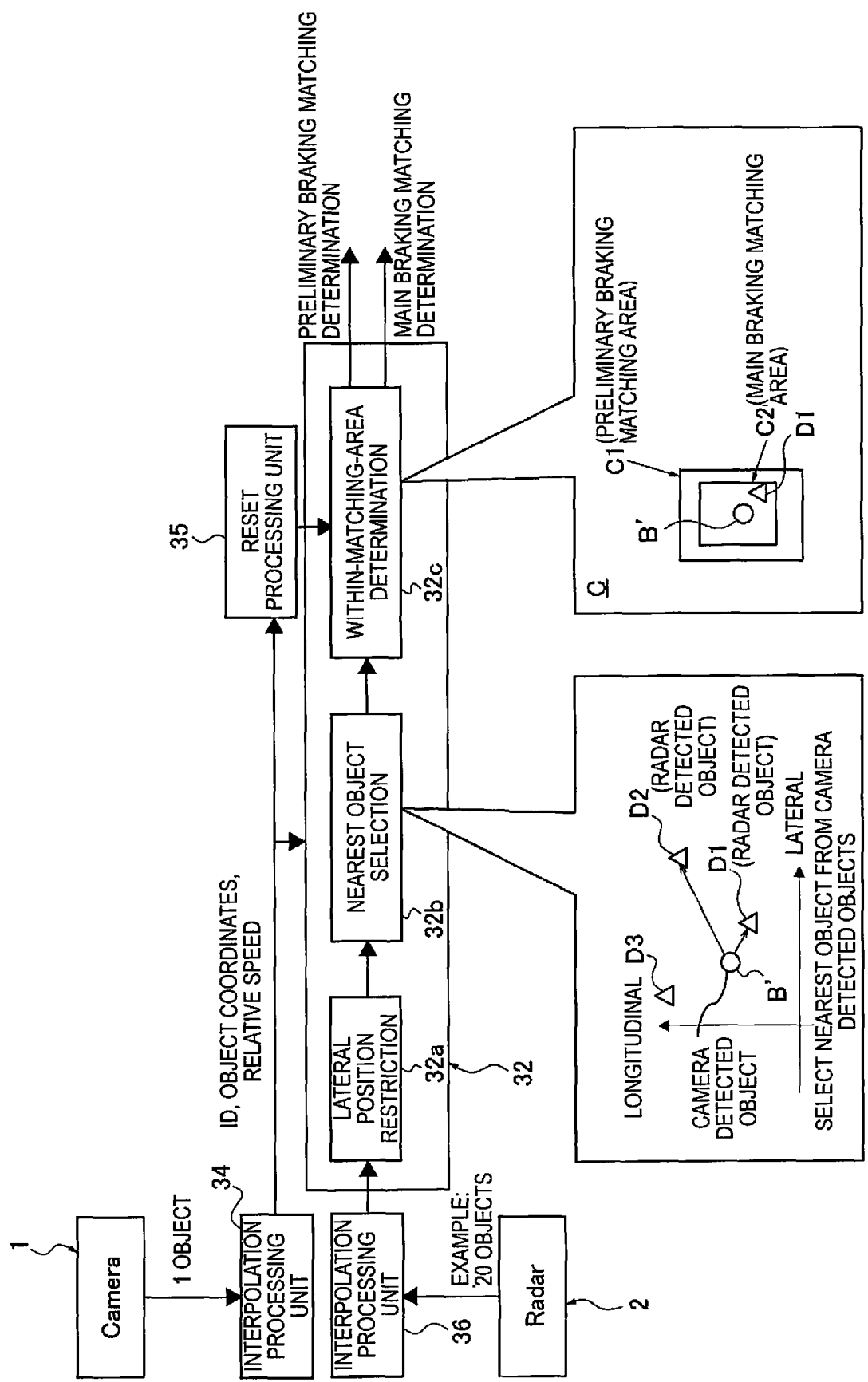
FIG. 2 is a block view illustrating the detailed configuration of a matching determination processing unit included in a driving assist controller according to the first embodiment.

FIG. 2 illustrates the detailed configuration of a matching determination processing unit 32 of the driving assist controller 3 according to the first embodiment. The detailed configuration of the matching determination processing unit 32 will be described below, with reference to FIG. 2.

An interpolation processing unit 34 and a reset processing unit 35 are provided between the front camera unit 1 and the matching determination processing unit 32, as illustrated in FIG. 2. The interpolation processing unit 34 carries out an interpolation process on the position information (maximum interpolation time of 300 msec) when a pedestrian candidate that is detected by the front camera unit 1 (one object to which an ID is attached) moves, calculates the relative speed and the coordinates of the object, and outputs the calculated data together with the ID to the matching determination processing unit 32 and the reset processing unit 35. When the pedestrian candidate that is detected by the front camera unit 1 changes and the lateral position changes by a predetermined distance or more (for example, 3 m or more), the reset processing unit 35 outputs a reset signal for resetting the matching result to a within-matching-area determination block 32c. If the change in the lateral position is less than the predetermined distance, the matching determination is continued.

An interpolation processing unit 36 is provided between the millimeter wave radar 2 and the matching determination processing unit 32, as illustrated in FIG. 2. The interpolation processing unit 36 carries out an interpolation process of the position information (maximum interpolation time of 300 msec) when objects (for example, 20 objects) that are detected by the millimeter wave radar 2 move, calculates the relative speeds and the coordinates of the objects, and outputs the calculated data to a lateral position restriction block 32a of the matching determination processing unit.

The matching determination processing unit 32 carries out matching determination, using the pedestrian candidate detected by the front camera unit 1 and the objects detected by the millimeter wave radar 2. This matching determination processing unit 32 comprises a lateral position restriction block 32a, a nearest object selection block 32b, and a within-matching-area determination block 32c, as illustrated in FIG. 2.

The lateral position restriction block 32a restricts the lateral position relative to the pedestrian candidate detected by the camera unit 1 within a predetermined distance (for example, ±2 m), and selects the objects that are present within the restricted range from among the plurality of objects (for example, 20 objects) input from the interpolation processing unit 36. The lateral position restriction block then outputs the plurality of selected objects to the nearest object selection block 32b.

The nearest object selection block 32b selects the object that is closest in distance from the pedestrian candidate from among the plurality of objects input from the lateral position restriction block 32a. The nearest object selection block then outputs the selected nearest object to the within-matching-area determination block 32c. As illustrated in the lower left side frame of FIG. 2, the "nearest object" here refers to the object D1 whose distance from the pedestrian candidate B' is closest, when a plurality of objects D1, D2, D3 (radar detection bodies) are present around the pedestrian candidate B'.

The within-matching-area determination block 32c inputs the nearest object D1 from the nearest object selection block 32b, determines whether or not the nearest object is present within a matching area C, which has been set with the pedestrian candidate B' as the center point, for a predetermined period of time, and outputs the matching determination result. In the within-matching-area determination block 32c, two matching determinations are carried out, a preliminary braking matching determination and a main braking matching determination.

Here, as illustrated in the lower right-side frame of FIG. 2, the matching area C includes a preliminary braking matching area C1 and a main braking matching area C2. The preliminary braking matching area C1, which is used for preliminary braking matching determination, is a matching area with the pedestrian candidate B' as the center point, and is set as a rectangular area having a larger area than the main braking matching area C2. The main braking matching area C2 is a matching area, with the pedestrian candidate B' as the center point, as in the preliminary braking matching area C1, and is set as a rectangular area having a smaller area than the preliminary braking matching area C1. A preliminary braking score map and a main braking score map, which are set based on the matching area C, are used for determining whether or not the nearest object D1 is present within the matching area C for a predetermined period of time (refer to FIGS. 9 and 10).

Configuration of the Automatic Brake Control Process

Figure 3:
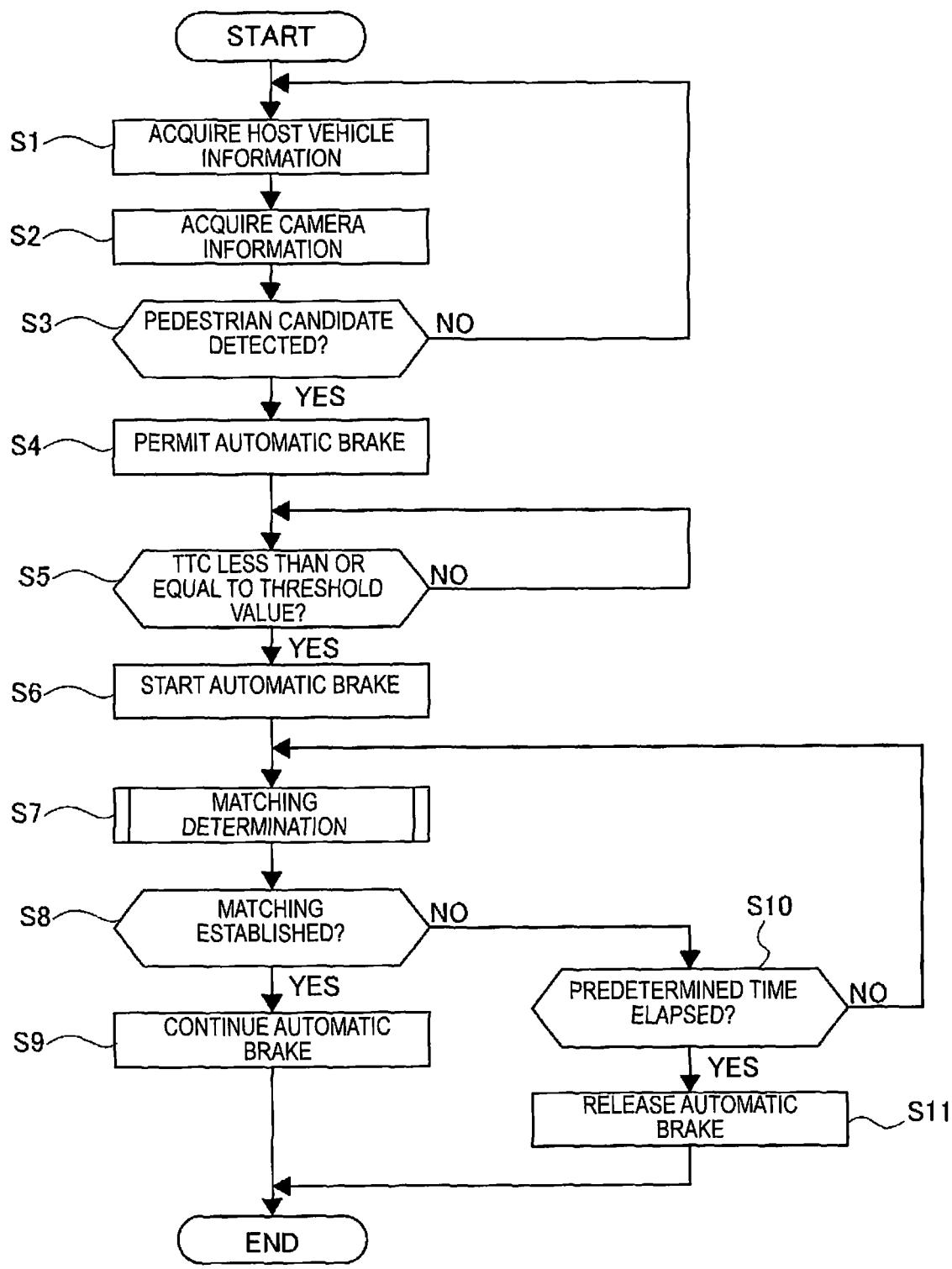
FIG. 3 is a flowchart illustrating the flow of an automatic brake control process when the target of control that is executed by the driving assist controller of the first embodiment is a pedestrian.

FIG. 3 illustrates the flow of an automatic brake control process when the target of control that is executed by the driving assist controller 3 of the first embodiment is a pedestrian. Each of the steps in FIG. 3, which represent the configuration of the automatic brake control process will be described below.

In Step S1, the host vehicle information is acquired and the process proceeds to Step S2. Here, "host vehicle information" refers to wheel speed, accelerator position opening amount, brake switch, brake fluid pressure, shift position, steering angle, steering angular velocity, acceleration, yaw rate, system ON/OFF state, etc., which are received from various on-board controllers by using CAN communication signals.

In Step S2, following the acquisition of the host vehicle information in Step S1, camera information is acquired from the front camera unit 1, and the process proceeds to Step S3. Here, "camera information" refers to image information in front of the vehicle that is acquired from the front camera unit 1.

In Step S3, following the acquisition of the camera information in Step S2, it is determined whether or not a pedestrian candidate has been detected based on the camera information. If YES (pedestrian candidate detected), the process proceeds to Step S4, and if NO (pedestrian candidate not detected), the process returns to Step S1. Here, the "detection of a pedestrian candidate" is carried out by a well-known pedestrian candidate detection method, in which various objects that are present in front of the vehicle are detected based on the image information from the front camera unit 1, and a pedestrian candidate is further detected from the plurality of objects, including preceding vehicles.

As disclosed in Japanese Laid-Open Patent Application No. 2009-294842, in an example of a well-known pedestrian candidate detection method, a feature point is extracted from an image captured by a camera, and a target region that includes a target three-dimensional object is extracted based on the movement information of the extracted feature point. Then, the movement information relating to the target region is compared with movement information relating to a comparison region that is set around the target region, and it is detected whether or not the target three-dimensional object is a pedestrian candidate based on the comparison result. In addition, as disclosed in Japanese Laid-Open Patent Application No. 2013-228915, a region in which a pedestrian's foot may be present is extracted from an image captured by a camera, and processing regions set within the extracted candidate region are divided into two classes. Then, a histogram is created representing the distribution of the degrees of separation of the brightness values between the two classes, and it is detected whether or not the target three-dimensional object is a pedestrian candidate based on the shape of the created histogram of the degrees of separation. Furthermore, as disclosed in Japanese Laid-Open Patent Application No. 2014-35560, a threshold value that is used when determining whether some of the movement speed information that is detected within the region of interest that represents darting out changes, depending on whether the host vehicle is traveling straight ahead or turning, in order to rapidly detect a pedestrian candidate that appears from a blind spot.

In Step S4, following the determination that a pedestrian candidate has been detected in Step S3, execution of the automatic brake control is permitted, and the process proceeds to Step S5. Here, "permit execution of automatic brake control" means to permit an automatic brake control that shifts from the alarm mode→the preliminary braking mode→the main braking mode, when, for example, the predicted time-to-contact TTC when a pedestrian candidate is detected gradually decreases from a value that exceeds the alarm threshold value TTC1.

In Step S5, following the permission to execute the automatic brake control in Step S4, it is determined whether the predicted time-to-contact TTC is less than or equal to the alarm threshold value TTC1, less than or equal to the preliminary braking threshold value TTC2, and less than or equal to the main braking threshold value TTC3. If YES (TTC≤TTC1, TTC2, TTC3), the process proceeds to Step S6, and if NO (TTC>TTC1), the determination of Step S5 is repeated. Here, the "alarm threshold value TTC1," the "preliminary braking threshold value TTC2," and the "main braking threshold value TTC3" are set to have the relationship: alarm threshold value TTC1>preliminary braking threshold value TTC2>main braking threshold value TTC3, as shown in the TTC threshold map of FIG. 4.

Figure 4:
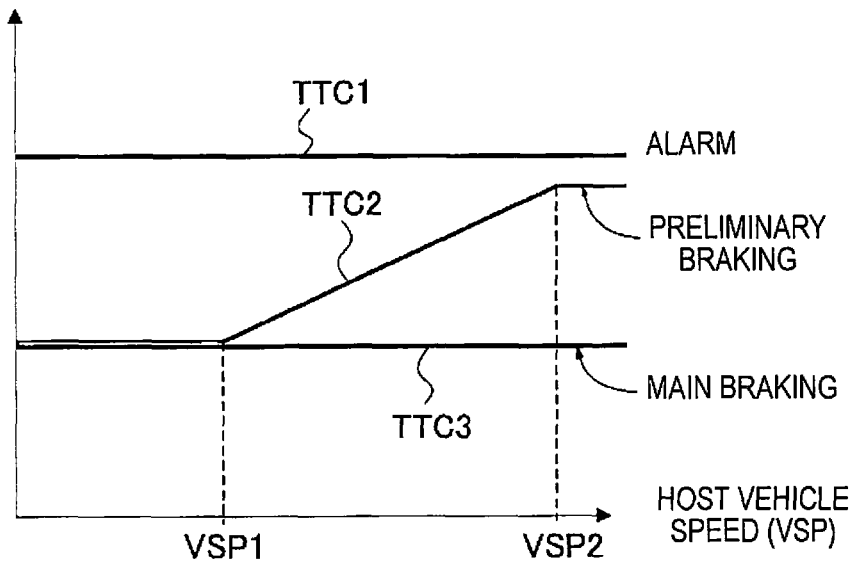
FIG. 4 is a TTC threshold map illustrating an alarm threshold value TTC1, a preliminary braking threshold value TTC2, and a main braking threshold value TTC3, which are used in the automatic brake control of the first embodiment.

To describe the TTC threshold value in more detail based on the TTC threshold map illustrated in FIG. 4: the alarm threshold value TTC1 is set to a value of a constant high predicted time-to-contact TTC regardless of the host vehicle speed (VSP). The preliminary braking threshold value TTC2 in a vehicle speed region of host vehicle speed≤first speed VSP1 is set to a constant value that matches the main braking threshold value TTC3. The preliminary braking threshold value TTC2 in a vehicle speed region of first speed VSP1<host vehicle speed<second speed VSP2 is set to have a characteristic that increases proportionally with the host vehicle speed (VSP). The preliminary braking threshold value TTC2 in a vehicle speed region of host vehicle speed≥second speed VSP2 is set to a constant value that is slightly smaller than the alarm threshold value TTC1. The main braking threshold value TTC3 is set to a value of a constant low predicted time-to-contact TTC regardless of the host vehicle speed (VSP). That is, in a low vehicle speed region of host vehicle speed≤first speed VSP1, there is no preliminary braking, and an automatic brake control by using an alarm and main braking is carried out. In a vehicle speed region of first speed VSP1<host vehicle speed<second speed VSP2, the TTC region of preliminary braking becomes wider as the host vehicle speed increases, and the TTC region of preliminary braking becomes narrower as the host vehicle speed decreases. If the target of control in the automatic brake control is a preceding vehicle, an automatic brake control is carried out, where the horizontal axis of the TTC threshold map represents the relative speed between the host vehicle and the preceding vehicle.

Figure 5:
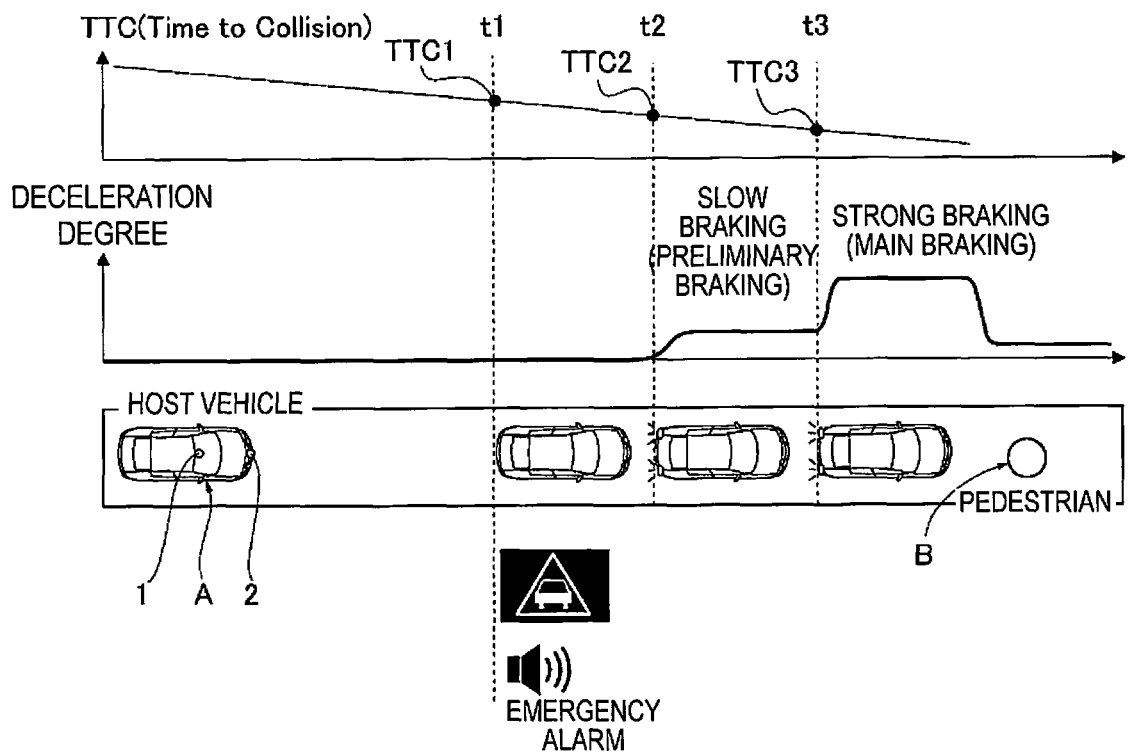
FIG. 5 is a time chart illustrating the automatic brake mode transition of an alarm mode, a preliminary braking mode, and a main braking mode, when the predicted time-to-contact TTC between the host vehicle and a pedestrian when the automatic brake control of the first embodiment is carried out decreases at a constant gradient.

In Step S6, following the determination that TTC≤TTC1, TTC2, TTC3 in Step S5, an automatic brake control is started, and the process proceeds to Step S7. Here, if the predicted time-to-contact TTC when an automatic brake control is permitted due to the detection of a pedestrian candidate is less than or equal to the alarm threshold value TTC1, an automatic brake control that shifts from alarm mode→preliminary braking mode→main braking mode is started, as illustrated in FIG. 5. If the predicted time-to-contact TTC when an automatic brake control is permitted due to the detection of a pedestrian candidate is less than or equal to the preliminary braking threshold value TTC2, an automatic brake control in which the mode shifts from preliminary braking mode (alarm)→main braking mode (alarm) is started. Additionally, if the predicted time-to-contact TTC when an automatic brake control is permitted due to the detection of a pedestrian candidate is less than or equal to the main braking threshold value TTC3, an automatic brake control for executing the main braking mode (alarm) is started.

The mode transition of the alarm mode, the preliminary braking mode, and the main braking mode, when the predicted time-to-contact TTC of the host vehicle with a pedestrian when the automatic brake control is carried out decreases at a constant gradient will be described with reference to the automatic brake time chart illustrated in FIG. 5. An automatic brake control is not started during the period up to time t1 when the predicted time-to-contact TTC of the host vehicle A with a pedestrian B is greater than the alarm threshold value TTC1. When the predicted time-to-contact TTC becomes less than or equal to the alarm threshold value TTC1 at time t1, driving assist from an emergency alarm, which notifies the driver visually and audibly by using a warning indication or a buzzer, is started. When the predicted time-to-contact TTC becomes less than or equal to the preliminary braking threshold value TTC2 at time t2, preliminary braking by using slow braking in addition to an emergency alarm is started. When the predicted time-to-contact TTC becomes less than or equal to the main braking threshold value TTC3 at time t3, main braking by using sudden braking in addition to an emergency alarm is started, and contact between the host vehicle A and the pedestrian B is prevented. Regarding this automatic brake control, a control according to the same mode transition is continuously carried out regardless of whether or not a matching determination is established.

In Step S7, following the starting of the automatic brake control in Step S6, or the determination that a predetermined time has not elapsed in Step S10, a comparison and a determination are made regarding whether or not a pedestrian candidate detected by the front camera unit 1 matches an object detected by the reflected waves from the millimeter wave radar 2, and the process proceeds to Step S8. Details of the matching determination process will be described in "Configuration of the Matching Determination Process" with reference to FIG. 6.

In Step S8, following the matching determination in Step S7, it is determined whether or not a matching has been established. If YES (matching established), the process proceeds to Step S9, and if NO (matching not established), the process proceeds to Step S10. Here, information on matching established/matching not established is received from the matching determination process shown in FIG. 6.

In Step S9, following the determination that matching has been established in Step S8, the pedestrian candidate B' detected by the front camera unit 1 is determined is determined to be pedestrian B, the control target, the automatic brake control is continued, and the process proceeds to END. Here, when pedestrian B as the target of control is determined due to the establishment of matching, the allowable deceleration G is set higher (for example, about 1.0 G) than the allowable deceleration G (for example, about 0.6 G) in the automatic brake control before the matching establishment but while the pedestrian candidate B' is being detected. In terms of the automatic brake control rule itself, the automatic brake control is continued by setting the same control rule regardless of whether or not matching is established.

In Step S10, following the determination that matching has not been established in Step S8, it is determined whether or not a predetermined time T has elapsed after the matching determination was started. If YES (predetermined time T has elapsed), the process proceeds to Step S11, and if NO (predetermined time T has not elapsed), the process returns to Step S7. Here, the "predetermined time T" is set to a time obtained by adding a margin time to the time required to determine a pedestrian B as the target of control, when a pedestrian candidate B' detected by the front camera unit 1 is a pedestrian that actually exists.

In Step S11, following the determination that a predetermined time T has elapsed in Step S10, the automatic brake control is canceled, and the process proceeds to END. That is, if it is determined that matching is not established, even when a predetermined time T has elapsed after starting the matching determination, it is determined that the pedestrian candidate B' detected by the front camera unit 1 is not a pedestrian B to be the target of control. When canceling the automatic brake control, when in alarm mode, the alarm is stopped, and when in the preliminary braking mode or the main braking mode, the alarm is stopped and the braking force that is imparted by the automatic brake control is released. The braking force release control is a control for releasing the braking force while suppressing a sudden change in the vehicle behavior; for example, a control is carried out in which the braking force at the time of automatic brake release is gradually reduced, or, the braking force at the time of automatic brake release is maintained for a predetermined time and then gradually released.

Configuration of the Matching Determination Process

Figure 6:
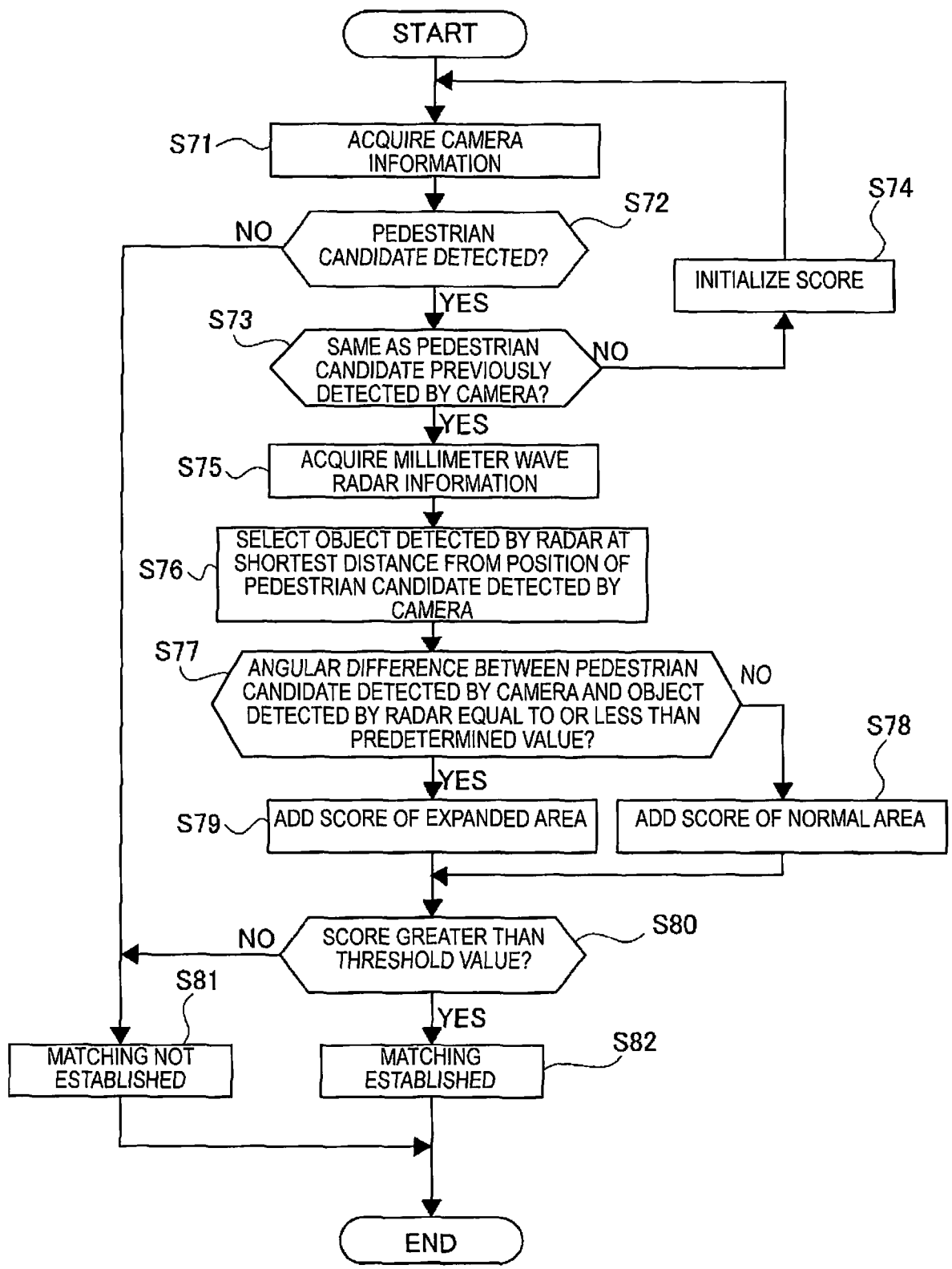
FIG. 6 is a flowchart illustrating the flow of a matching determination process (preliminary braking matching determination process and main braking matching determination process) that is executed in Step S7 of FIG. 3.

FIG. 6 illustrates the flow of a matching determination process (preliminary braking matching determination process and main braking matching determination process) that is executed in Step S7 of FIG. 3. Each of the steps in FIG. 6, which represents the configuration of the matching determination process, will be described below. When an automatic brake control is started, a preliminary braking matching determination process using a preliminary braking score map is carried out first. Then, when matching is established in the preliminary braking matching determination, a main braking matching determination process using a main braking score map is carried out. That is, the preliminary braking matching determination process and the main braking matching determination process are different only in the timing to start the matching determination process and the score map, and have the same content of the matching determination process.

In Step S71, following START or initialization of the score in Step S74, camera information is acquired from the front camera unit 1, and the process proceeds to Step S72. Here, "camera information" refers to image information in front of the vehicle that is acquired from the front camera unit 1.

In Step S72, following the acquisition of the camera information in Step S71, it is determined whether or not a pedestrian candidate has been detected based on the camera information. If YES (pedestrian candidate detected), the process proceeds to Step S73, and if NO (pedestrian candidate not detected), the process returns to Step S81. Here, the "detection of a pedestrian candidate" is carried out by a well-known pedestrian candidate detection method in the same manner as in Step S3 of FIG. 3.

In Step S73, following the determination that a pedestrian candidate is detected in Step S72, it is determined whether or not the pedestrian candidate detected this time is the same as the pedestrian candidate detected the last time by the front camera unit 1. If YES (pedestrian candidates are the same), the process proceeds to Step S75, and if NO (pedestrian candidates are different), the process proceeds to Step S74. Here, the determination of whether or not the previously detected pedestrian candidate is the same as the currently detected pedestrian candidate is carried out by comparing the IDs that are attached to the pedestrian candidates.

In Step S74, following the determination that the pedestrian candidates are different in Step S73, the score that has been added up to that point is initialized, and the process returns to Step S71.

In Step S75, following the determination that the pedestrian candidates are the same in Step S73, information is acquired from the millimeter wave radar 2, and the process proceeds to Step S76.

In Step S76, following the acquisition of millimeter wave radar information in Step S75, objects are narrowed down, from among the plurality of objects that are detected by reflected waves from the millimeter wave radar 2, by using lateral position restriction, after which the nearest object is selected and the process proceeds to Step S77. Here, upon selection of the nearest object, in a scenario in which a pedestrian is crossing in front of the host vehicle, it is assumed that a pedestrian candidate B' is being detected by the front camera unit 1, as illustrated in FIG. 5. At this time, from among a plurality of objects D1, D2, D3 that are detected by reflected waves from the millimeter wave radar 2, an object D1 whose distance from the pedestrian candidate B' is the shortest is selected as the nearest object.

Figure 8:
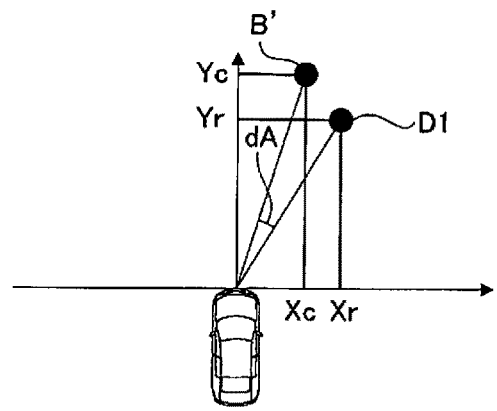
FIG. 8 is an explanatory view illustrating an angle difference for expanding a preliminary braking matching area and a main braking matching area in the matching determination process shown in FIG. 6.

In Step S77, following the selection of the nearest object in Step S76, it is determined whether or not the angular difference dA between the detection angle of the pedestrian candidate B' detected by the front camera unit 1 and the detection angle of the nearest object D1 detected by the millimeter wave radar 2 is less than or equal to a predetermined value (for example, 5 deg). If YES (angular difference dA≤predetermined value), the process proceeds to Step S79, and if NO (angular difference dA>predetermined value), the process proceeds to Step S78. Here, the "angular difference dA" is the angular difference between the detection angle of the pedestrian candidate B' and the detection angle of the nearest object D1, as illustrated in FIG. 8. The "predetermined value" is set to the angular difference value at which it is determined that the direction of the pedestrian candidate B' substantially matches the direction of the nearest object D1, when the front camera unit 1 and the pedestrian candidate B1 are separated by a distance.

In Step S78, following the determination that the angular difference dA>predetermined value in Step S77, a score of the object D1 is added using a score map that has a normal area, and the process proceeds to Step S80.

Figure 7:
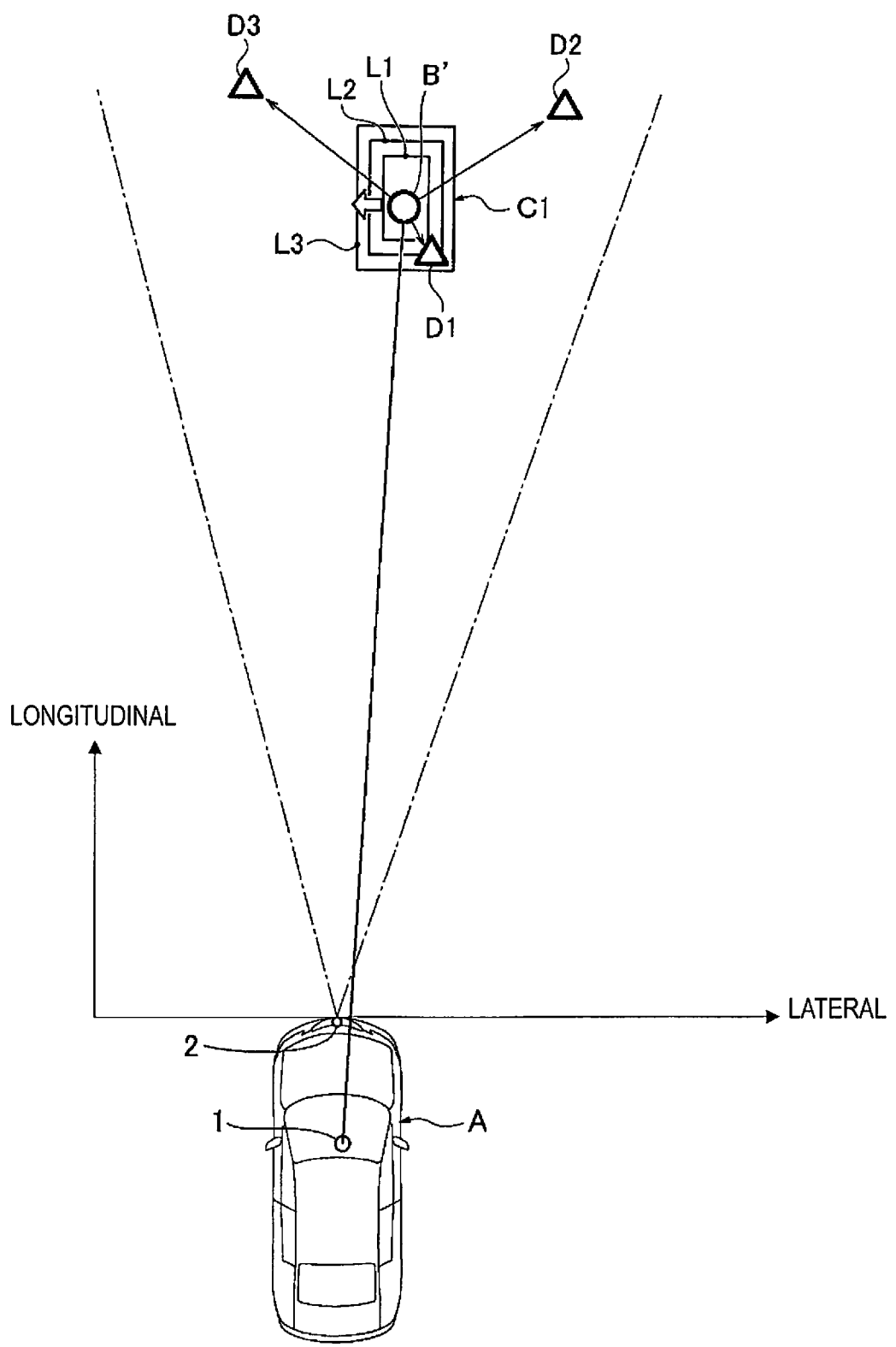
FIG. 7 is a matching determination schematic explanatory view illustrating a general overview of the preliminary braking matching determination.
Figure 9:
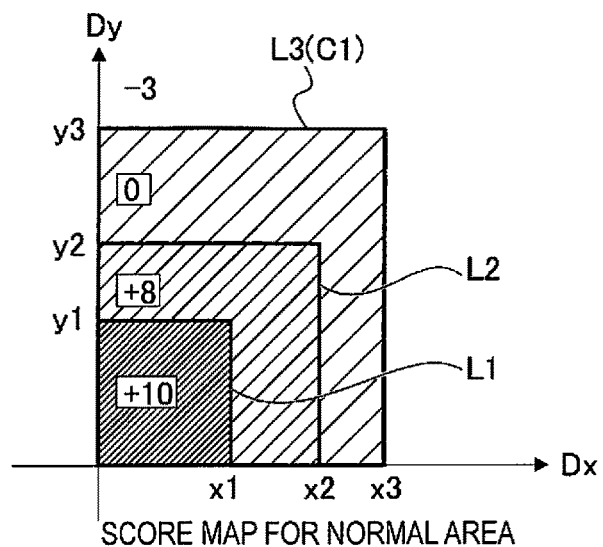
FIG. 9 is a score map view illustrating one example of a score map according to a normal area in the preliminary braking matching area.

Here, regarding the "score map that has a normal area," in the case of a preliminary braking matching area C1, a first score line L1, a second score line L2, and an area boundary score line L3, centered around the pedestrian candidate B', are used to divide the area into four concentric regions, as illustrated in FIG. 7. Then, the score map has a normal area in which positive side scores (0, +8, +10), which increase with decreasing distance from the center point (pedestrian candidate B'), are assigned to the area inside of the area boundary score line L3, and a negative side score (−3) is assigned to the area outside of the area boundary score line L3, as illustrated in FIG. 9. The same applies to the case of the main braking matching area C2.

"Adding the score" refers to adding the score per one control cycle (for example, 10 msec) when a matching determination is carried out. The value of the score per one control cycle shall be the score (point) of the area into which the nearest object D1 is plotted with respect to preliminary braking matching area C1 represented on the Dx, Dy coordinate axes, as illustrated in FIG. 9.

Note that Dx and Dy are $$Dx=|Xr-Xc|$$

$$Dy=|Yr-Yc|$$

where Xc: X coordinate of the pedestrian candidate B', Yc: Y coordinate of the pedestrian candidate B', Xr: X coordinate of object D1, Yrc: Y coordinate of object D1.

In Step S79, following the determination that the angular difference dA≤predetermined value in Step S77, the score of the object D1 is added using a score map that has an expanded area, and the process proceeds to Step S80.

Figure 10:
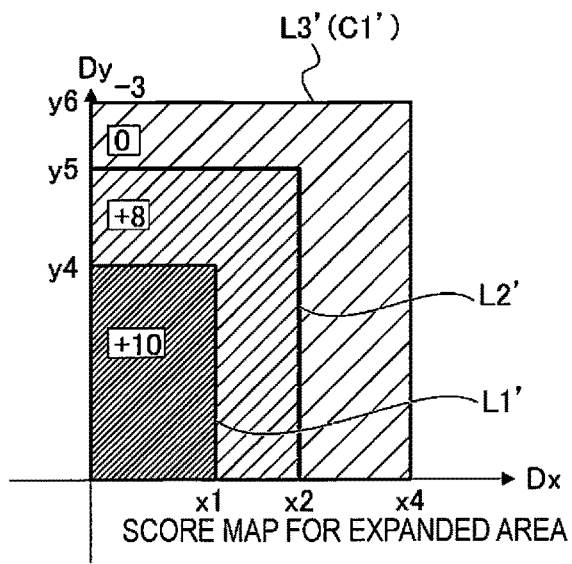
FIG. 10 is a score map view illustrating one example of a score map according to an expanded area in the preliminary braking matching area.

Here, in the case of a preliminary braking matching area C1, a "score map that has an expanded area" refers to a score map that has been changed to a preliminary braking matching area C1', which has been expanded in the longitudinal direction, which is the longitudinal direction of the host vehicle A, as is clear from a comparison between FIG. 9 and FIG. 10. This expanded preliminary braking matching area C1' is divided into four concentric regions by a first score line L1', a second score line L2', and an area boundary score line L3', with the pedestrian candidate B' as the center. Then, the score map has an expanded area in which positive side scores (0, +8, +10), which increase with decreasing distance to the center point (pedestrian candidate B'), are assigned to the area inside of the area boundary score line L3', and a negative side score (−3) is assigned to the area outside of the area boundary score line L3, as illustrated in FIG. 10. The same applies to the case of the expanded main braking matching area C2'.

In the expanded preliminary braking matching area C1', the Y-axis direction coordinate y4 of the first score line L1' is set to be greater than the Y-axis direction coordinate y3 of the area boundary score line L3 of the normal area C1 (longitudinal expansion). In addition, the X-axis direction coordinates x1 and x2 of the first score line L1 and the second score line L2' are the same as those in the normal area C1, and only the X-axis direction coordinate x4 of the area boundary score line L3 is set to be greater than the X-axis direction coordinate x3 of the area boundary score line L3 of the normal area C1. "Adding the score" is the same as in Step S78.

In Step S80, following the score addition of the normal area or the expanded area in Step S78 or Step S79, it is determined whether or not the added score is greater than a threshold value. If YES (score>threshold value), the process proceeds to Step S82, and if NO (score≤threshold value), the process proceeds to Step S81. Here, the "threshold value" is set to a value with which it is determined that matching is established with good responsiveness since the conformity between the pedestrian candidate B' and the object D1 is higher, for example, to a value of about 200. That is, when the threshold value is set to 200 and one control cycle is set to 10 msec, in the shortest case, in which the scores are added with a value of (+10) per one control cycle, it will be determined that matching is established in 200 msec.

In Step S81, following the determination that score≤threshold value in Step S80, a matching result indicating that matching is not established is output, and the process proceeds to END.

In Step S82, following the determination that score>threshold value in Step S80, a matching result indicating that matching is established is output, and the process proceeds to END.

Next, the actions are described. The "action of the automatic brake control process," "action of the automatic brake control," "action of the matching determination process," "action of the matching determination," and "characteristic action of the matching determination" will be described separately regarding the actions of the first embodiment.

Action of the Automatic Brake Control Process

The action of the automatic brake control process will be described below, based on the flowchart of FIG. 3. When a pedestrian candidate B' is not detected based on camera information, the process that proceeds from Step S1→Step S2→Step S3 in the flowchart of FIG. 3 is repeated. Then, when a pedestrian candidate B' is detected based on camera information, the process proceeds from Step S3 to Step S4, and in Step S4, the execution of an automatic brake control is permitted.

When execution of an automatic brake control is permitted in Step S4, the process proceeds from Step S4 to Step S5, and in Step S5, it is determined whether the predicted time-to-contact TTC is less than or equal to the alarm threshold value TTC1, less than or equal to the preliminary braking threshold value TTC2, and less than or equal to the main braking threshold value TTC3. When it is determined that TTC≤TTC1, or TTC≤TTC2, or TTC≤TTC3 in Step S5, the process proceeds to Step S6, and in Step S6, an automatic brake control is started. Here, when it is determined that TTC≤TTC1, an automatic brake control that shifts from alarm mode→preliminary braking mode→main braking mode is started. When it is determined that TTC≤TTC2, an automatic brake control in which the mode shifts from preliminary braking mode (alarm)→main braking mode (alarm) is started. When it is determined that TTC≤TTC3, an automatic brake control for executing the main braking mode (alarm) is started.

When automatic brake control is started in Step S6, the process proceeds from Step S6 to Step S7, and in Step S7, a comparison and a determination are made regarding whether or not the pedestrian candidate B' detected by the front camera unit 1 matches the object D1 detected by the reflected waves from the millimeter wave radar 2. In addition, while matching is not established and the predetermined time T has not elapsed, the process that proceeds from Step S7→Step S8→Step S10 is repeated.

When it is determined that matching is established in Step S8 while the process that proceeds from Step S7→Step S8→Step S10 is being repeated, the process proceeds from Step S8 to Step S9→END. In Step S9, the pedestrian candidate B' detected by the front camera unit 1 is determined to be pedestrian B, the control target, the allowable deceleration G is increased, and the automatic brake control is continued.

On the other hand, if the predetermined time T elapses while the process that proceeds from Step S7→Step S8→Step S10 is being repeated, the process proceeds from Step S10 to Step S11→END. In Step S11, the pedestrian candidate B' detected by the front camera unit 1 is determined not to be pedestrian B, the control target, and the automatic brake control is canceled.

In this manner, in the automatic brake control process, when a pedestrian candidate B' is detected in front of the host vehicle A based on an image signal from the front camera unit 1, execution of automatic brake control is permitted, with the detected pedestrian candidate B' as the target of control (Step S4). Then, after starting the automatic brake control, a comparison and a determination are made regarding whether or not the pedestrian candidate B' detected by the front camera unit 1 matches an object D1 detected by the reflected waves from the millimeter wave radar 2 (Step S7). Then, if matching is established before a predetermined time T elapses, the automatic brake control is continued (Step S9), and if matching is not established before a predetermined time T elapses, the automatic brake control is canceled (Step S11).

Action of the Automatic Brake Control

Figure 11:
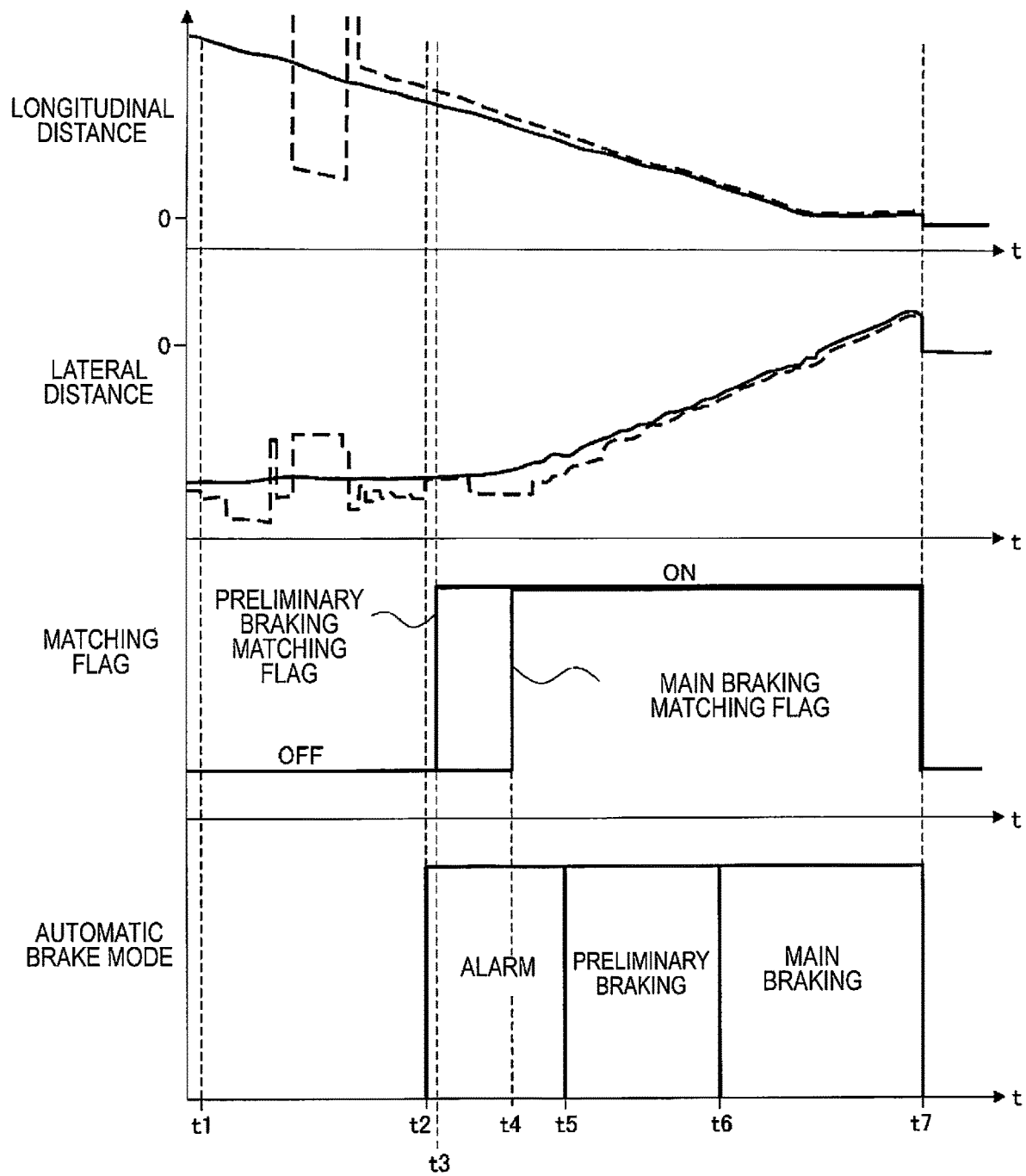
FIG. 11 is a time chart illustrating the respective characteristics of a longitudinal distance, a lateral distance, a matching flag (preliminary braking matching flag, main braking matching flag), and an automatic brake mode, in a scenario in which a pedestrian crosses a forward position on a predicted path of the host vehicle.

The action of the automatic brake control when a pedestrian B crosses at a forward position on a predicted path of the host vehicle A, as illustrated in FIG. 7, will be described with reference to FIG. 11. In FIG. 11, the longitudinal distance refers to the distance between the host vehicle A and the pedestrian candidate B' (pedestrian B) in the vertical direction of FIG. 7, and longitudinal distance=0 becomes the contact distance in the longitudinal direction. The lateral distance refers to the distance between the host vehicle A and the pedestrian candidate B' (pedestrian B) in the lateral direction, and lateral distance=0 becomes the contact distance in the lateral direction.

When a pedestrian candidate B' that is present in front of the host vehicle A is detected based on an image signal from the front camera unit 1 at time t1, execution of an automatic brake control is permitted, and monitoring of the predicted time-to-contact TTC is started. When the predicted time-to-contact TTC becomes less than or equal to the alarm threshold value TTC1 at time t2, an automatic brake control by using an alarm is started, and a matching determination between the detected pedestrian candidate B' and an object D1 detected by the reflected waves from the millimeter wave radar 2 is started. When it is determined that matching is established by the preliminary braking matching determination at time t3 (preliminary braking matching flag ON), the automatic brake control that was started with the pedestrian candidate B' as the target of control is continued until the preliminary braking. Then, when it is determined that matching is established by the main braking matching determination at time t4 (main braking matching flag ON), the pedestrian candidate B' is confirmed as a pedestrian B as the target of control, and the automatic brake control is continued until the main braking takes place. Thereafter, when the predicted time-to-contact TTC becomes less than or equal to the preliminary braking threshold value TTC2 at time t5, an automatic brake control by using an alarm and preliminary braking is started. Furthermore, when the predicted time-to-contact TTC becomes less than or equal to the main braking threshold value TTC3 at time t6, automatic brake control by using an alarm and main braking is started. Then, when the deceleration G is increased by the main braking and time t7 is reached, the host vehicle A stops immediately in front of the pedestrian B.

In this manner, in the first embodiment, when an object that is present in front of the host vehicle A is detected to be a pedestrian candidate B' based on an image signal from the front camera unit 1, execution of an automatic brake control is permitted, with the detected pedestrian candidate B' as the target of control. Then, a matching determination is carried out between the pedestrian candidate B' detected by the front camera unit 1 and the object D1 detected by the reflected waves from the millimeter wave radar 2.

Accordingly, the start timing of the automatic brake control becomes earlier compared with waiting for the comparative determination results of a pedestrian B from both the front camera unit 1 and the millimeter wave radar 2. Thereafter, a matching determination is carried out between the pedestrian candidate B' detected by the front camera unit 1 and the object D1 detected by the reflected waves from the millimeter wave radar 2, and it is determined whether or not to continue the automatic brake control based on the matching determination result. Accordingly, a function for preventing erroneous determination of a pedestrian B is ensured Operation of the Matching Determination Process The operation of the matching determination process will be described based on the flowchart of FIG. 6. If a pedestrian candidate B' is detected by the front camera unit 1 but is different from the previously detected pedestrian candidate B', the process proceeds from Step S71→Step S72→Step S73→Step S74 in the flowchart of FIG. 6. In Step S74, the score is initialized, the process returns from Step S74 to Step S71, and a reset processing of the matching determination is carried out.

If a pedestrian candidate B' is detected by the front camera unit 1 and the previous and current pedestrian candidate B' are the same, the process proceeds from Step S71→Step S72→Step S73→Step S75→Step S76→Step S77 in the flowchart of FIG. 6. In Step S77, it is determined whether or not the angular difference dA between the detection angle of the pedestrian candidate B' detected by the front camera unit 1 and the detection angle of the nearest object D1 detected by the millimeter wave radar 2 is less than or equal to a predetermined value. If it is determined that angular difference dA>predetermined value in Step S77, the process proceeds to Step S78, and in Step S78, the score of the normal area is added. If it is determined that angular difference dA<predetermined value in Step S77, the process proceeds to Step S79, and in Step S79, the score of the expanded area is added.

Then, when the score of the normal area or the expanded area is added in Step S78 or Step S79, the process proceeds to Step S80, and in Step S80, it is determined whether or not the added score is greater than the threshold value. While score≤threshold value is satisfied in the determination of Step S80, the process proceeds from Step S80 to Step S81→END, and in Step S81, a matching result indicating that matching is not established is output. Thereafter, when the score>threshold value is satisfied in the determination of Step S80, the process proceeds from Step S80 to Step S82→END, and in Step S82, a matching result indicating that matching is established is output.

In this manner, in the matching determination process of the first embodiment, when a pedestrian candidate B' is detected by the front camera unit 1, a matching area C is set with the position of the detected pedestrian candidate B' as the center point. Then, when the position of the object D1 that is closest to the pedestrian candidate B' detected by the millimeter wave radar 2 is present within the matching area C for a predetermined period of time and a match is established (Step S82), the pedestrian candidate B' is determined to be a pedestrian B. Furthermore, if the angular difference dA between the detection angle of the pedestrian candidate B' and the detection angle of the object D1 is less than or equal to a predetermined value (YES in Step S77), the matching area C is set to a matching area C', which is expanded from the normal area in the longitudinal direction (Step S79).

Action of the Matching Determination

As an example of a scenario in which it is beneficial to accelerate the determination of a pedestrian B, the action of the matching determination will be described for a scenario in which a pedestrian B darts out in front of the host vehicle A and into the predicted course of the host vehicle A from a stopped vehicle E (blind spot), with reference to FIG. 12.

In the scenario in which a pedestrian B darts out into the predicted travel path of the host vehicle A from a stopped vehicle E, if pedestrian determination is carried out based on information from the front camera unit 1, it is possible to determine the presence of a pedestrian by using shape recognition. However, if object detection (pedestrian detection) is carried out based on information from the millimeter wave radar 2, since the stopped vehicle E and the pedestrian B are detected as an integral object, as illustrated in the right portion of FIG. 12, pedestrian determination cannot be started until enough time has elapsed to ensure that there is sufficient space between the stopped vehicle E and the pedestrian B.

In contrast, when a pedestrian candidate B' is detected by the front camera unit 1, a preliminary braking matching area C1 is set with the position of the detected pedestrian candidate B' as the center point. Then, when the position of the object D1 that is closest to the pedestrian candidate B' detected by the millimeter wave radar 2 is present within the preliminary braking matching area C1 for a predetermined period of time and a match is established, the pedestrian candidate B' is determined to be pedestrian B. Therefore, the determination of pedestrian B is performed more quickly compared with the case in which object detection by the millimeter wave radar 2 is prioritized.

Figure 12:
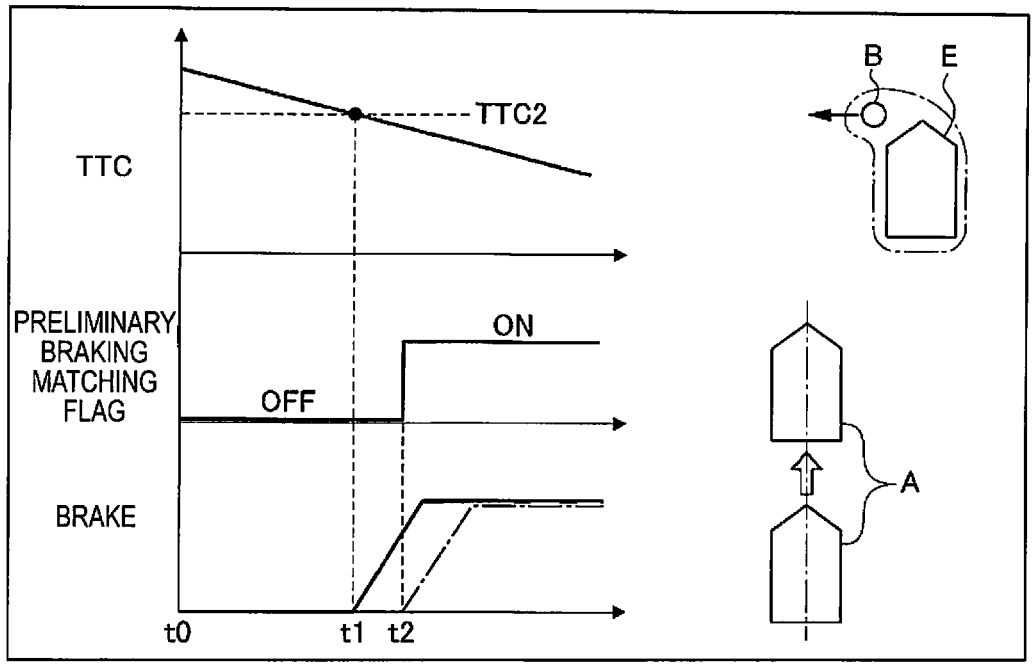
FIG. 12 is a time chart illustrating the respective characteristics of TTC, preliminary braking matching flag, and brake, in a scenario in which a pedestrian darts out in front of the host vehicle and into the predicted path of the host vehicle from a stopped vehicle.

Furthermore, if automatic brake control is started after waiting until the preliminary braking matching flag is turned ON, the starting of the automatic brake control is delayed, such as the preliminary braking being started after time t2, as illustrated in FIG. 12. In contrast, if a pedestrian candidate B' is detected based on information from the front camera unit 1, and if execution of an automatic brake control is permitted without waiting for the preliminary braking matching flag to be turned ON, execution of the automatic brake control is permitted at, for example, time t0. Accordingly, automatic brake control is started sooner, such as the preliminary braking being started at time t1.

Next, as an example of a scenario in which it is beneficial to prevent an erroneous determination in the matching determination of a pedestrian B, the action of automatic braking will be described for a scenario in which white smoke exhaust gas G is being emitted from a preceding vehicle F that is present on a predicted path in front of the host vehicle A, with reference to FIG. 13.

Figure 13:
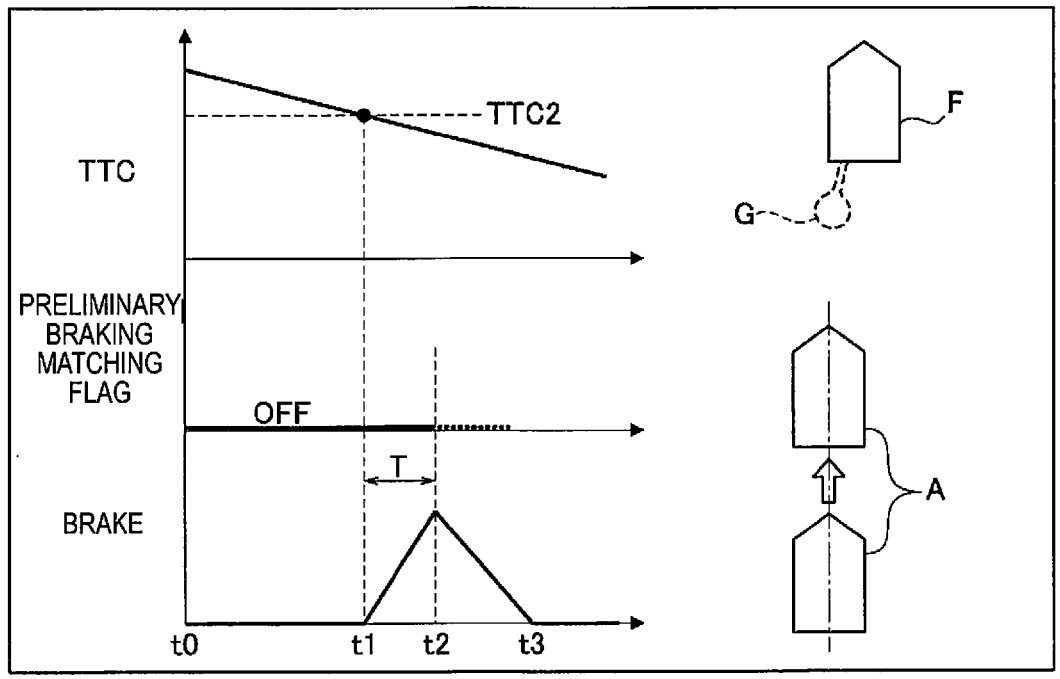
FIG. 13 is a time chart illustrating the respective characteristics of TTC, preliminary braking matching flag, and brake, in a scenario in which white smoke exhaust gas is being emitted from a preceding vehicle that is present in front of the host vehicle in the predicted path thereof.

In the scenario in which white smoke exhaust gas G is being emitted from a preceding vehicle F, in the case of object detection based on information from the front camera unit 1, there are cases in which the white smoke exhaust gas G is erroneously detected as a pedestrian due to the use of shape recognition, as illustrated in the right portion of FIG. 13. On the other hand, when object detection based on information from the millimeter wave radar 2 is carried out, since the reflected waves of irradiated millimeter waves are used, the white smoke exhaust gas G will not be erroneously detected as a pedestrian.

Therefore, when a pedestrian candidate B' is detected based on information from the front camera unit 1 and the predicted time-to-contact TTC becomes less than or equal to the preliminary braking threshold value TTC2, even if preliminary braking is started at time t1, the millimeter wave radar 2 does not detect an object, and a predetermined time T elapses while the preliminary braking matching flag remains OFF. Accordingly, the automatic brake control is canceled at time t2, after which the braking force that is imparted by the preliminary braking is gradually reduced, and the actual cancellation of the braking force is achieved at time t3.

Characteristic Action of the Matching Determination

In the first embodiment, when a pedestrian candidate B' is detected at a position ahead of the host vehicle A based on an image signal from the front camera unit 1, a matching area C is set with the position of the detected pedestrian candidate B' as the center point. When the position of the object D1 closest to the pedestrian candidate B' from among the plurality of objects detected by reflected waves from the millimeter wave radar 2 is present within the matching area C and a match is established, the pedestrian candidate B' is determined to be a pedestrian B.

That is, when a pedestrian B that is in front of the host vehicle A is detected by using the front camera unit 1 and the millimeter wave radar 2, the front camera unit 1 and the millimeter wave radar 2 have the following advantages and disadvantages.

The front camera unit 1 has the advantage that it is possible to discriminate and detect a moving object that has a human shape as a pedestrian by using shape recognition. However, there is the disadvantage that there are cases in which objects are erroneously detected, such as during bad weather, when there is backlighting ahead, when an object blends into the background colors, when there are road markers, and when the exhaust smoke is extremely dense.

On the other hand, the millimeter wave radar 2 has the advantage that it can detect an object that is relatively far away, it is relatively unaffected by bad weather, and backlighting is not an issue; therefore, object recognition capability is greater compared to the front camera unit 1 when an object is present in front of the host vehicle. However, there is the disadvantage that is it practically impossible to distinguish whether an object is a preceding vehicle or a pedestrian.

With regard to the advantages and disadvantages of the front camera unit 1 and the millimeter wave radar 2 described above: when a pedestrian candidate B' is detected based on camera information that is capable of independently detecting a pedestrian by using shape recognition, a matching area C is set in advance with the pedestrian candidate B' as the center point. Then, when a pedestrian B is present in front of the host vehicle A, an object D1 that is detected by a millimeter wave radar 2, which has greater object recognition capability than the front camera unit 1, is used for determining a match with the pedestrian B, to thereby determine a pedestrian B in a short period of time. Furthermore, when matching determination of the pedestrian candidate B' is carried out by adding the time condition that the pedestrian candidate is present within the matching area C for a predetermined period of time, erroneous determination caused by instantaneous matching is eliminated, and the pedestrian B is precisely determined.

In the first embodiment, the matching area C is divided into a plurality of concentric regions by a plurality of score lines L1, L2, L3, with the pedestrian candidate B' at the center point. The score map is configured such that positive side scores, which increase with decreasing distance to the center point, are assigned to the area inside of the area boundary score line L3, and a negative side score is allocated to the area outside of the area boundary score line L3. When the value obtained by adding a score per one control cycle for carrying out matching determination becomes greater than or equal to a predetermined threshold value, the pedestrian candidate B' is determined to be a pedestrian B by established matching. For example, if a matching time for which an object D1 is present within a matching area is set to a fixed time, when the conformity between the pedestrian candidate B' and the object D1 is high, the determination of an established matching is delayed. On the other hand, if the conformity between the pedestrian candidate B' and the object D1 is low, there is the risk that an established matching is determined even if there is the possibility that matching is not established. In contrast, by employing matching determination that uses the added value of the scores, an established match can be determined sooner when the conformity between the pedestrian candidate B' and the object D1 is high and matching accuracy is ensured. On the other hand, when the conformity between the pedestrian candidate B' and the object D1 is low and matching accuracy is not ensured, the determination of an established match is delayed. Therefore, when a matching determination is carried out, the determination responsiveness is improved when the conformity between the pedestrian candidate B' and the object D1 is high, and the determination accuracy is improved when the conformity is low.

In the first embodiment, the angular difference dA between the detection angle of the pedestrian candidate B' detected by the front camera unit 1 and the detection angle of the object D1 detected by the millimeter wave radar 2 is obtained. When the angular difference dA is a predetermined value or less, the matching area C that is used when the angular difference dA exceeds the predetermined value is switched to a matching area C' that is expanded in the longitudinal direction, which is the longitudinal direction of the host vehicle A. The reason for using the expanded matching area C' is that when the front camera unit 1 detects a pedestrian candidate B', the pixels become coarser as the distance from the pedestrian candidate B' increases, due to the characteristics of the camera, which generates an error in the distance between the host vehicle A and the pedestrian B in the Y-axis direction. Consequently, the position of the pedestrian candidate B' detected by the front camera unit 1 is separated from the position of the object D1 detected by the millimeter wave radar 2, and a matching determination cannot be carried out within the normal matching area C. However, if the position of the pedestrian candidate B' and the position of the object D1 are in the same direction (for example, the angular difference is within 5 degrees), a matching determination becomes possible by using the expanded matching area C'. Therefore, when a matching determination is carried out, a matching determination becomes possible even at long distances between the host vehicle A and the pedestrian candidate B', under the condition that the positions of the pedestrian candidate B' and the object D1 are in the same direction.

In the first embodiment, a preliminary braking matching area C1 for carrying out a matching determination when the host vehicle A and the pedestrian B are at a first distance, and a main braking matching area C2 for carrying out a matching determination when the host vehicle A and the pedestrian B are at a second distance, which is less than the first distance, having a smaller area than the first matching area, are set as the matching areas C. That is, the distance error for the pedestrian candidate B' according to the front camera unit 1 increases as the distance between the host vehicle A and the pedestrian candidate B' increases, and there are cases in which the matching determination is delayed. Accordingly, a preliminary braking matching area C1 that is used for a matching determination at a far distance with a wide area, and a main braking matching area C2 that is used for a matching determination at a short distance with a narrow area, are set as the matching areas C. Therefore, when a matching determination is carried out, a delay in the matching determination is prevented regardless of whether the distance between the host vehicle A and the pedestrian candidate B' is long or short.

The first embodiment is applied to an automatic brake control system, in which, when it is determined that the host vehicle A and a pedestrian B could come in contact, preliminary braking by using slow braking is carried out, and if the possibility of contact increases during the preliminary braking, main braking by using sudden braking is carried out so as to prevent contact between the host vehicle A and the pedestrian B. The first matching area is the preliminary braking matching area C1 that is used for determining pedestrians when preliminary braking is carried out, and the second matching area is the main braking matching area C2 that is used for determining pedestrians when main braking is carried out. That is, in automatic brake control, it is necessary that the execution of preliminary braking by using pedestrian determination is permitted before the start condition for preliminary braking is established, and it is necessary that the execution of main braking by using a pedestrian determination is permitted before the start condition for main braking is established. Therefore, by carrying out matching determination using a preliminary braking matching area C1 and a main braking matching area C2, which have different areas, it is possible to guarantee permissions for the execution of preliminary braking and main braking according to a determination that matching has been established before starting the preliminary braking and the main braking, when automatic brake control is carried out.

Next, the effects are described. The effects listed below can be obtained according to the pedestrian determination method and determination device of the first embodiment.

(1) External environment recognition sensors that acquire forward information of a host vehicle A are provided, to determine that a pedestrian B is present in a forward position of the host vehicle A using external environment recognition sensors. In this pedestrian determination method, a camera (front camera unit 1) and a radar (millimeter wave radar 2) are provided as the external environment recognition sensors. When a pedestrian candidate B' is detected in a forward position of the host vehicle A based on an image signal from the camera (front camera unit 1), a matching area C is set with the position of the detected pedestrian candidate B' as the center point. When the position of the object D1 that is closest to the pedestrian candidate B' from among the plurality of objects D1, D2, D3 detected by reflected waves from the radar (millimeter wave radar 2) is present within the matching area C and a match is established, the pedestrian candidate B' is determined to be a pedestrian B (FIG. 6). Accordingly, it is possible to provide a pedestrian determination method that improves the pedestrian determination responsiveness, when determining a pedestrian B using a camera (front camera unit 1) and a radar (millimeter wave radar 2) while traveling.

(2) It is determined that matching is established, when a time during which an object D1 that is closest to the pedestrian candidate B' is present within the matching area C for a predetermined period of time or more (FIG. 6). Accordingly, in addition to the effect of (1), it is possible to improve pedestrian determination responsiveness, when detecting a pedestrian B using a camera (front camera unit 1) and a radar (millimeter wave radar 2).

(3) The matching area C is divided into a plurality of concentric regions by a plurality of score lines L1, L2, L3 centered around the pedestrian candidate B', and a score map is configured such that positive side scores, which increase with decreasing distance from the center point, are assigned to the area inside of an area boundary score line L3, and a negative side score is assigned to the area outside of the area boundary score line L3. When the value obtained by adding a score per one control cycle for carrying out a matching determination becomes greater than or equal to a predetermined threshold value, the pedestrian candidate B' is determined to be a pedestrian B by an established matching (FIGS. 9 and 10). Accordingly, in addition to the effect of (1) or (2), when a matching determination is carried out, the pedestrian determination responsiveness is improved when the conformity between the pedestrian candidate B' and the object D1 is high, and the determination accuracy is improved when the conformity is low.

(4) When the angular difference dA between the detection angle of a pedestrian candidate B' detected by the camera (front camera unit 1) and the detection angle of an object D1 detected by the radar (millimeter wave radar 2) is a predetermined value or smaller, the matching area C that is used when the angular difference dA exceeds the predetermined value is switched to a matching area C' that is expanded in the longitudinal direction, which is the longitudinal direction of the host vehicle A (FIGS. 8 to 10). Accordingly, in addition to the effects of (1) to (3), when a matching determination is carried out, the matching determination can be carried out even at long distances between the host vehicle A and the pedestrian candidate B', under the condition that the positions of the pedestrian candidate B' and the object D1 are in the same direction.

(5) A first matching area (preliminary braking matching area C1) for carrying out a matching determination when the host vehicle A and the pedestrian B are at a first distance, and a second matching area (main braking matching area C2) for carrying out matching determination when the host vehicle A and the pedestrian B are at a second distance, which is shorter than the first distance, having a smaller area than the first matching area, are set as the matching areas C (FIG. 2). Accordingly, in addition to the effects of (1) to (4), when a matching determination is carried out, delays in the matching determination are prevented regardless of whether the distance between the host vehicle A and the pedestrian candidate B' is long or short.

(6) The method is applied to an automatic brake control system, in which, upon determining that the host vehicle A could come into contact with a pedestrian B, preliminary braking by using slow braking is carried out, and if the possibility of contact increases during the preliminary braking, main braking by using sudden braking is carried out, to thereby prevent contact between the host vehicle A and the pedestrian B. The first matching area is a preliminary braking matching area C1 that is used for determining pedestrians when carrying out the preliminary braking. The second matching area is a main braking matching area C2 that is used for determining pedestrians when carrying out the main braking (FIG. 2). Accordingly, in addition to the effect of (5), it is possible to guarantee permissions for the execution of preliminary braking and main braking according to a determination that matching has been established before starting the preliminary braking and the main braking, when carrying out an automatic brake control.

(7) External environment recognition sensors, which acquire forward information of a host vehicle A and a matching determination processing unit 32 that determines that a pedestrian B is present in a forward position of the host vehicle A using the external environment recognition sensors, are provided. This pedestrian determination device is provided with a camera (front camera unit 1) and a radar (millimeter wave radar 2) as the external environment recognition sensors. The matching determination processing unit 32 carries out a process to set a matching area C with the position of the pedestrian candidate B' that has been detected as the center point, when the pedestrian candidate B' is detected in a forward position of the host vehicle A based on an image signal from the camera (Front camera unit 1). Then, a process is carried out to determine whether the pedestrian candidate B' is a pedestrian B, when the position of an object D1 that is closest to the pedestrian candidate B' from among a plurality of objects D1, D2, D3 detected by reflected waves from the radar (millimeter wave radar 2) is within the matching area C and a match is established (FIG. 6). Accordingly, it is possible to provide a pedestrian determination device that improves the pedestrian determination responsiveness, when determining a pedestrian B using a camera (front camera unit 1) and a radar (millimeter wave radar 2) during travel.

The pedestrian determination method and determination device of the present invention were described above based on a first embodiment, but specific configurations thereof are not limited to this first embodiment, and various design modifications and additions can be made without departing from the scope of the invention according to each claim in the Claims.

In the first embodiment, an example was presented in which a front camera unit 1, which is a single camera (monocular camera), is used as the camera. However, a stereo camera configured from a pair of front cameras may be used as the camera.

In the first embodiment, an example was presented in which a millimeter wave radar 2, which irradiates millimeter waves toward the front of the vehicle, is used as the radar. However, an infrared laser radar may be used, or a millimeter wave radar and an infrared laser radar may be used in combination, as the radar.

In the first embodiment, an example was presented in which the pedestrian determination method and determination device are applied to an automatic brake control. However, the pedestrian determination method and determination device may be applied to other driving assist controls, such as a driving assist control that prevents contact by controlling the host vehicle to avoid a pedestrian by braking and steering, as long as the control is one in which a pedestrian that is present in front of the host vehicle is the target of control.

In the first embodiment, an example was presented in which a rectangular matching area C set with the position of a pedestrian candidate B', which is determined by the front camera unit 1, as the center point, was used as the matching area for matching determination. However, a matching area having a shape different than rectangular, such as circular or elliptical, may be used as the matching area for matching determination.

In the first embodiment, a control example was presented in which the mode shifts from alarm mode→preliminary braking mode→main braking mode, as the automatic brake control. However, the example may be such that the automatic brake control may be configured from only the alarm mode and a braking mode.

In the first embodiment, an example was presented in which the pedestrian determination method and determination device of the present invention are applied to an electrically driven vehicle equipped with an automatic brake control system and an electrically controlled brake unit 4. However, the pedestrian determination method and determination device of the present invention can be applied to a vehicle equipped with another driving assist control system that prevents contact between the host vehicle and a pedestrian by using a drive source control, a steering control, a brake control other than an automatic brake control system, etc. Furthermore, in addition to an electrically driven vehicle, the pedestrian determination method and determination device can also be applied to an engine-powered vehicle; in this case, for example, an electric pump motor of an ABS/VDC actuator is used as the brake actuator. In other words, the method and device can be applied as long as the pedestrian determination method and determination device use external environment recognition sensors during travel to determine that a pedestrian is present at a position in front of a host vehicle.

The invention claimed is:

1. A pedestrian determination method that is provided with external environment recognition sensors that obtain forward information of a host vehicle and that uses the external environment recognition sensors to determine that a pedestrian is present in a forward position of the host vehicle, the method comprising:
providing a camera and a radar as the external environment recognition sensors;
setting a matching area based on a position of a pedestrian candidate that is detected as a center point, upon detecting the pedestrian candidate in the forward position of the host vehicle based on an image signal from the camera; and determining the pedestrian candidate to be a pedestrian when a position of an object closest to the pedestrian candidate from among a plurality of objects detected by reflected waves from the radar is present within the matching area and a match is established; and expanding the matching area when the position of the pedestrian candidate and the position of the object are in a same direction.

2. The pedestrian determination method according to claim 1, wherein
the match has been determined to be established when a time during which an object that is closest to the pedestrian candidate is present within the matching area for a predetermined period of time or more.

3. The pedestrian determination method according to claim 1, wherein
the matching area is divided into a plurality of concentric regions by a plurality of score lines centered around the pedestrian candidate, and a score map is configured such that positive side scores that increase with decreasing distance to the center point are assigned to an area inside of an area boundary score line, and a negative side score is assigned to an area outside of the area boundary score line, and
when a value obtained by adding a score per one control cycle for carrying out the matching determination becomes greater than or equal to a predetermined threshold value, the pedestrian candidate is determined to be a pedestrian by establishing a match.

4. The pedestrian determination method according to claim 1, wherein
when an angular difference between a detection angle of a pedestrian candidate detected by the camera and a detection angle of an object detected by the radar is a predetermined value or smaller, the matching area that is used when the angular difference exceeds the predetermined value is switched to a matching area that is expanded in a longitudinal direction, which is the longitudinal direction of the host vehicle.

5. The pedestrian determination method according to claim 1, wherein
a first matching area for carrying out matching determination when the host vehicle and a pedestrian are at a first distance, and a second matching area for carrying out matching determination when the host vehicle and a pedestrian are at a second distance, which is less than the first distance, and having a smaller area than the first matching area, are set as the matching areas.

6. The pedestrian determination method according to claim 5, wherein
the method is applied to an automatic brake control system, in which, upon determining that the host vehicle and a pedestrian could come in contact, preliminary braking by using slow braking is carried out, and if the possibility of contact increases during the preliminary braking, main braking by sudden braking is carried out, thereby preventing contact between the host vehicle and the pedestrian,
the first matching area is a preliminary braking matching area that is used for determining pedestrians when carrying out the preliminary braking, and
the second matching area is a main braking matching area that is used for determining pedestrians when carrying out the main braking.

7. A pedestrian determination device comprising:
external environment recognition sensors that acquire forward information for a host vehicle; and
a matching determination processing unit that determines that a pedestrian is present in a forward position of the host vehicle using the external environment recognition sensors;
the external environment recognition sensors including a camera and a radar; and
the matching determination processing unit carries out a process
to set a matching area based on a position of a pedestrian candidate that is detected as the center point, upon detecting the pedestrian candidate in the forward position of the host vehicle based on an image signal from the camera, and
to determine the pedestrian candidate to be a pedestrian, when the position of an object that is closest to the pedestrian candidate from among a plurality of objects detected by reflected waves from the radar is within the matching area and a match is established, and
to expand the matching area when the position of the pedestrian candidate and the position of the object are in a same direction.

8. A pedestrian determination method that is provided with external environment recognition sensors that obtain forward information of a host vehicle, and that uses the external environment recognition sensors to determine that a pedestrian is present in a forward position of the host vehicle, the method comprising:
providing a camera and a radar as the external environment recognition sensors;
setting a matching area based on a position of a pedestrian candidate that is detected, upon detecting the pedestrian candidate in the forward position of the host vehicle based on an image signal from the camera;
setting, as the matching area, a first matching area for carrying out a matching determination when the host vehicle and a pedestrian candidate are separated by a first distance, and a second matching area for carrying out a matching determination when the host vehicle and a pedestrian candidate are separated by a second distance, which is shorter than the first distance, having a smaller area than the first matching area; and
determining the pedestrian candidate to be a pedestrian, when the position of an object closest to the pedestrian candidate from among a plurality of objects detected by reflected waves from the radar is present within the matching area and a match is established.

* * * * *